(12) United States Patent
Saeler

(10) Patent No.: US 7,861,433 B2
(45) Date of Patent: Jan. 4, 2011

(54) RAILWAY CAR COUPLER RECONDITIONING CONTOUR GAUGE

(75) Inventor: Kevin S. Saeler, Stoneboro, PA (US)

(73) Assignee: McConway & Torley, LLC, Dallas, TX (US)

(*) Notice: Subject to any disclaimer, the term of this patent is extended or adjusted under 35 U.S.C. 154(b) by 338 days.

(21) Appl. No.: 12/182,859

(22) Filed: Jul. 30, 2008

(65) Prior Publication Data

US 2010/0024232 A1 Feb. 4, 2010

(51) Int. Cl.
*G01D 21/00* (2006.01)

(52) U.S. Cl. .......................................... 33/546; 33/651

(58) Field of Classification Search ................... 33/546, 33/541, 550, 551, 651
See application file for complete search history.

(56) References Cited

U.S. PATENT DOCUMENTS

| 491,174 A | 2/1893 | Hazlehurst et al. |
| 606,851 A * | 7/1898 | Ware ........................... 33/651 |
| 2,039,086 A * | 4/1936 | Kinne .......................... 72/364 |
| D369,756 S * | 5/1996 | Noel ............................ D10/64 |
| 7,020,977 B2 * | 4/2006 | Brueckert et al. ............. 33/651 |
| 7,059,062 B2 * | 6/2006 | Brueckert et al. ............. 33/651 |
| 2003/0037422 A1 | 2/2003 | Brueckert et al. |
| 2007/0251908 A1 * | 11/2007 | Utsumi ................... 213/75 TC |

OTHER PUBLICATIONS

PCT Notification of Transmittal of the International Search Report and the Written Opinion of the International Searching Authority, (ISA/EPO)or the Declaration, International Application No. PCT/US2009/050468, dated Oct. 13, 2009, 13 pages.

* cited by examiner

*Primary Examiner*—G. Bradley Bennett
*Assistant Examiner*—Tania C Courson
(74) *Attorney, Agent, or Firm*—Baker Botts L.L.P.

(57) ABSTRACT

A railway car coupler head contour gauge includes a cylindrical portion configured to be rotatably coupled to a coupler head. A gauging blade is coupled to the cylindrical portion. The gauging blade includes a gauging contour that is configured to align with a contour face of a top pulling lug of the coupler head after operational use of the coupler head.

21 Claims, 4 Drawing Sheets

RAILWAY CAR COUPLER RECONDITIONING CONTOUR GAUGE

TECHNICAL FIELD

The present disclosure is related to railway car couplers, and more particularly to a railway car coupler contour gauge and method.

BACKGROUND

The type-E coupler is the standard coupler for railway freight cars. As the standard coupler, all producers of such couplers in the United States are required to produce the couplers to a standard specification. Also, a coupler may be reconditioned to extend its useful life. Whether produced originally or reconditioned, couplers must meet certain specifications to ensure that they are completely interchangeable regardless of the manufacturer. In addition, couplers from any manufacturer should be able to be readily joined with couplers from any other domestic manufacturer.

The Association of American Railroads ("AAR") has adopted standards for railway couplers. The coupler must include specific geometry and dimensions that allow it to receive a knuckle, and the geometry must be such that the knuckle is allowed to freely operate when coupling and uncoupling railway cars. These dimensions and features of the coupler may be checked for compliance with AAR standards by using gauges. When gauges are applied to a coupler in a prescribed manner, it may be verified that certain dimensions of the coupler fall within an allowable variation or tolerance range.

SUMMARY

The teachings of the present disclosure include a railway car coupler contour gauge that is capable of gauging a contour on a face of a top pulling lug of a railway car coupler head after operational use of the coupler head.

In accordance with a particular embodiment of the present disclosure, a railway car coupler head contour gauge includes a cylindrical portion configured to be rotatably coupled to a coupler head. A gauging blade is coupled to the cylindrical portion. The gauging blade includes a gauging contour that is configured to align with a contour face of a top pulling lug of the coupler head after operational use of the coupler head.

In accordance with a further embodiment of the present disclosure, a method of measuring a railway car coupler head after operational use of the coupler head includes rotatably coupling a coupler head to a coupler head contour gauge. The coupler head contour gauge includes a cylindrical portion and a gauging blade with a gauging contour. After operational use of the coupler head, the gauging contour is aligned with a contour face of a top pulling lug of the coupler head. A clearance may be formed between the contour face and the gauging contour when so aligned.

Technical advantages of particular embodiments of the present invention include the ability to inspect a front face contour of a railway car coupler that has been used in operation to ensure that a knuckle will fit properly to a railway car coupler and operate properly when coupling and decoupling railway car couplers attached to adjacent railway cars.

Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE DRAWINGS

A more complete understanding of embodiments of the invention will be apparent from the detailed description taken in conjunction with the accompanying drawings in which.

DETAILED DESCRIPTION

Figure 1:
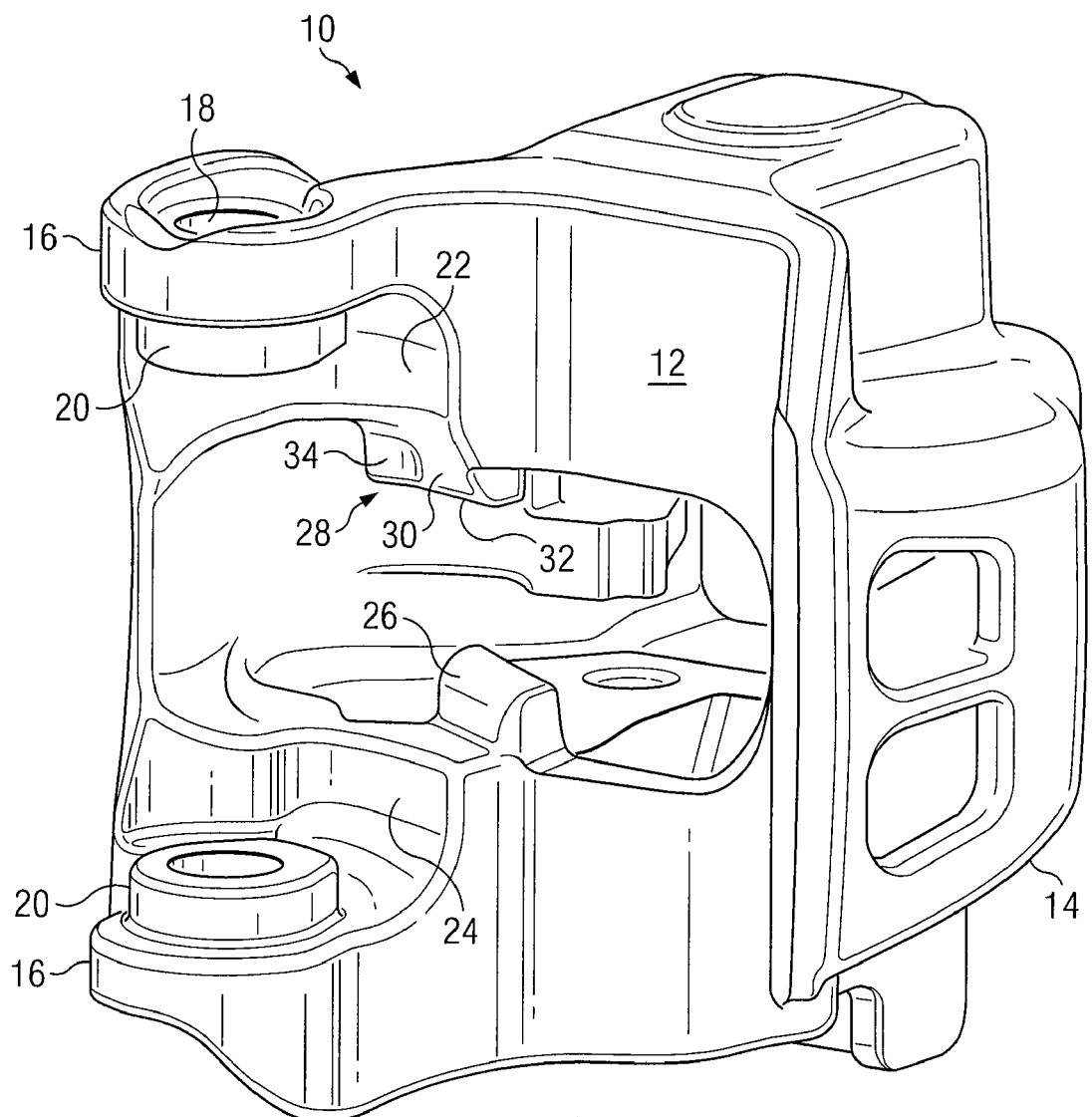
FIG. 1 is an isometric view of a railway car coupler head that may be gauged for operational compliance with an embodiment of the present disclosure.
Figure 2:
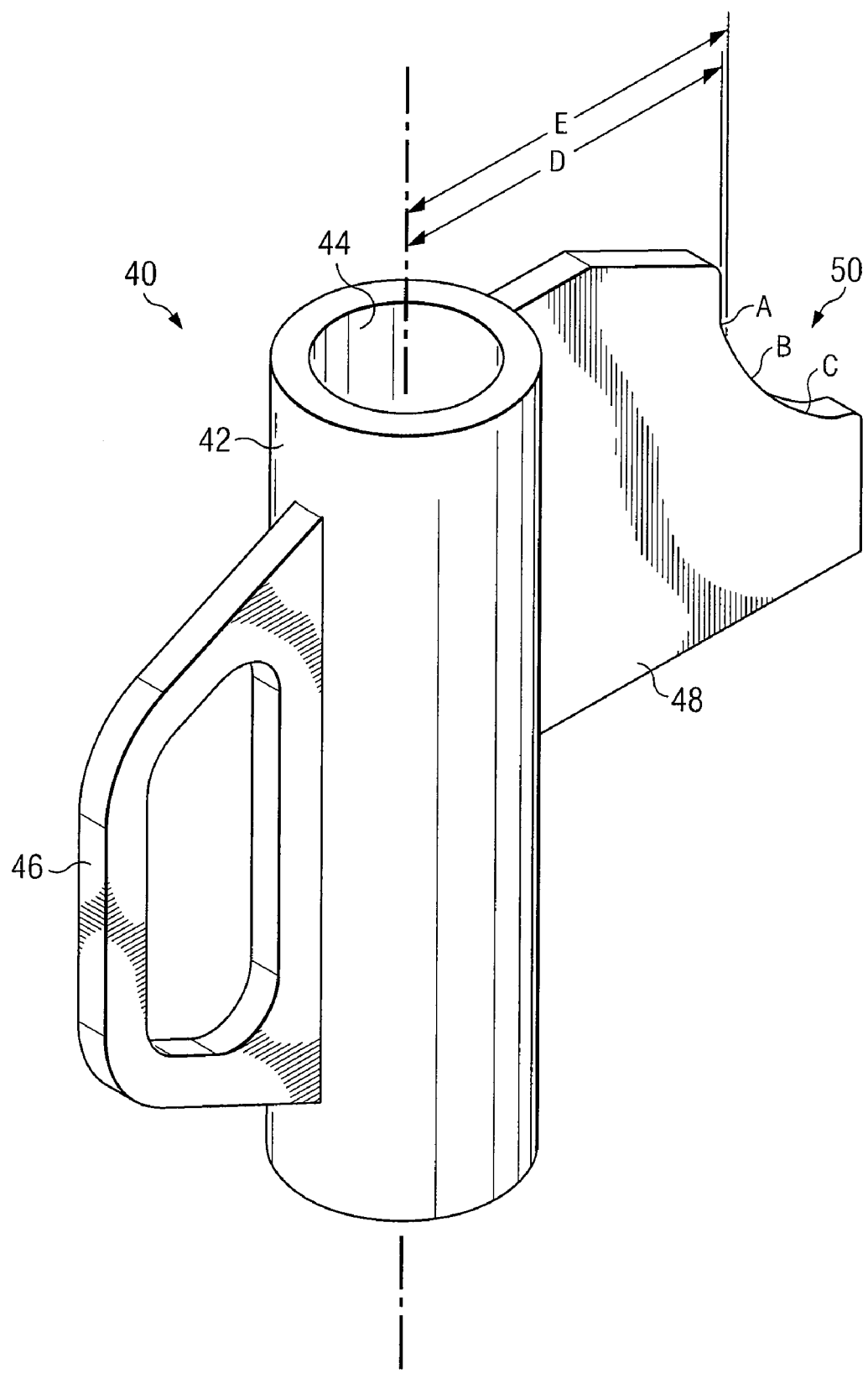
FIG. 2 is an isometric view of a top pulling lug contour gauge in accordance with an embodiment of the present disclosure.
Figure 3:
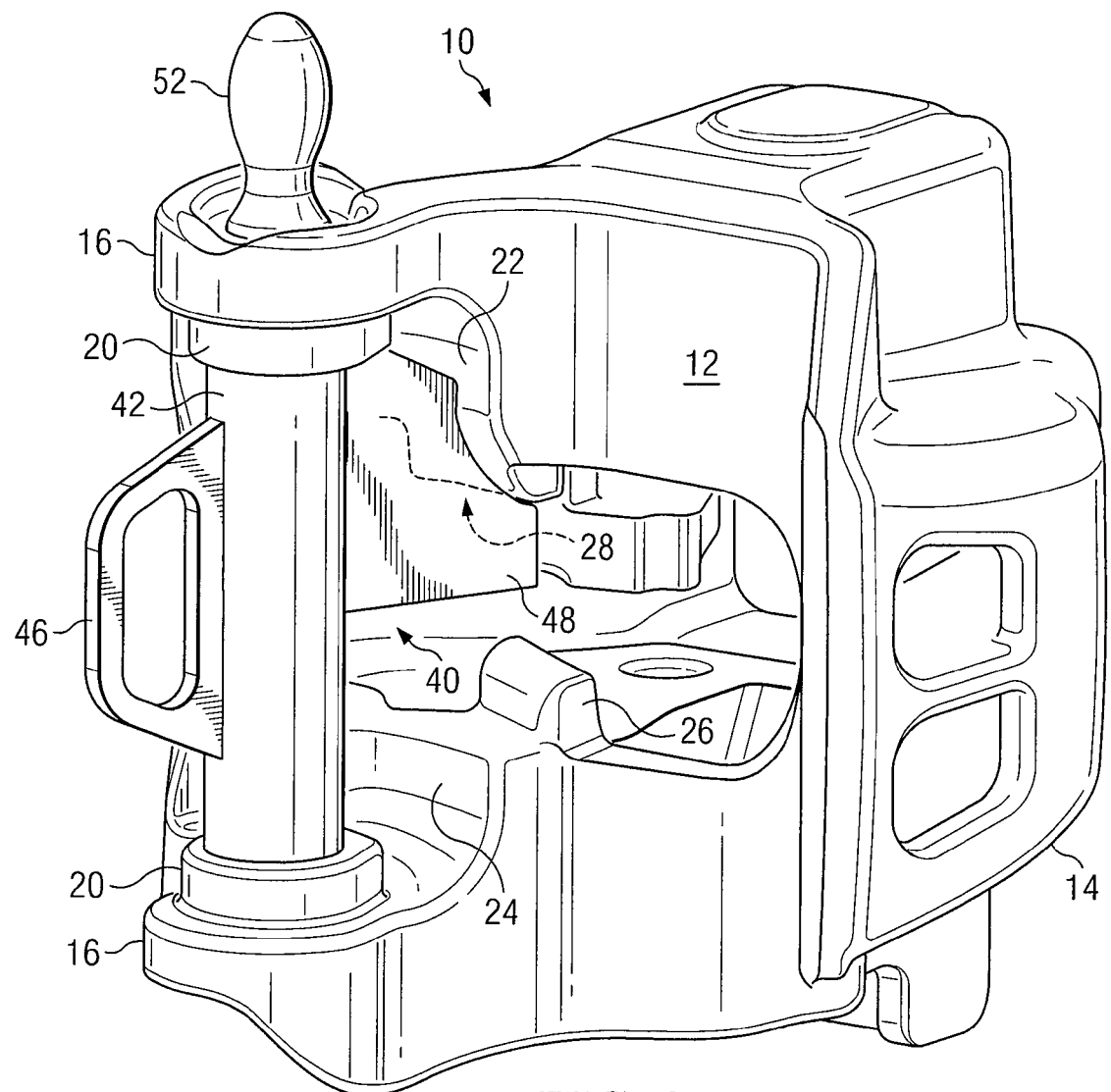
FIG. 3 illustrates a railway car coupler and a top pulling lug contour gauge in accordance with a particular embodiment of the present invention.

Example embodiments of the present invention and their advantages are best understood by referring to FIGS. 1 through 3 of the drawings.

FIG. 1 illustrates a railway car coupler head 10. Railway car coupler head 10 may be part of a type E coupler, a type F coupler, a type EF coupler, or another type of coupler. A type E coupler head is illustrated. Coupler head 10 includes guard arm 14. Opposite guard arm 14 is the knuckle side of coupler head 10. Between the knuckle side and guard arm 14 is front face 12.

Coupler head 10 may be configured to receive a knuckle (not shown). The knuckle may be received and retained in a pivotal manner with a pin (not shown) that extends through pinholes 18 of pivot lugs 16. The pin may be protected by pin protectors 20 when it extends through pivot holes 18 and a corresponding pinhole in the knuckle. Located behind pivot lugs 16 are top buffing shoulder 22 and bottom buffing shoulder 24. Together, top and bottom buffering shoulders 22 and 24 form a pocket for receiving the knuckle. Buffing shoulders 22 and 24 may receive the transferred load from an interfacing surface of a knuckle when the railway car experiences buff (pushing) motions.

Extending from a lower portion of coupler head 10 adjacent bottom buffing shoulder 24 is bottom pulling lug 26. Extending from a top surface of coupler head 10 adjacent top buffing shoulder 22 is top pulling lug 28. At least a portion of top pulling lug 28 may be generally aligned with a portion of bottom pulling lug 26.

When a knuckle is assembled with coupler head 10, pulling lugs 26 and 28 may engage corresponding pulling surfaces of the knuckle. This engagement may allow pulling lugs 26 and 28 to receive a transfer draft load from a corresponding knuckle of a mating coupler on an adjacent railcar.

Top pulling lug 28 includes top pulling lug face 30. Top pulling lug face 30 is a contoured surface that generally extends from top buffing shoulder 22 to an underside 32 of top pulling lug 28. Adjacent top pulling lug face 30 is top pulling lug indentation 34.

In some situations after the coupler has been in operational use, portions of this contoured surface of top pulling lug face 30 may become enlarged or deformed such that a knuckle may not properly attach to coupler head 10 or operate properly when attached. Accordingly, conformity of top pulling lug face 30 for proper knuckle attachment and operation may be assured using a contour gauge in accordance with an embodiment of the present disclosure.

Figure 1A:
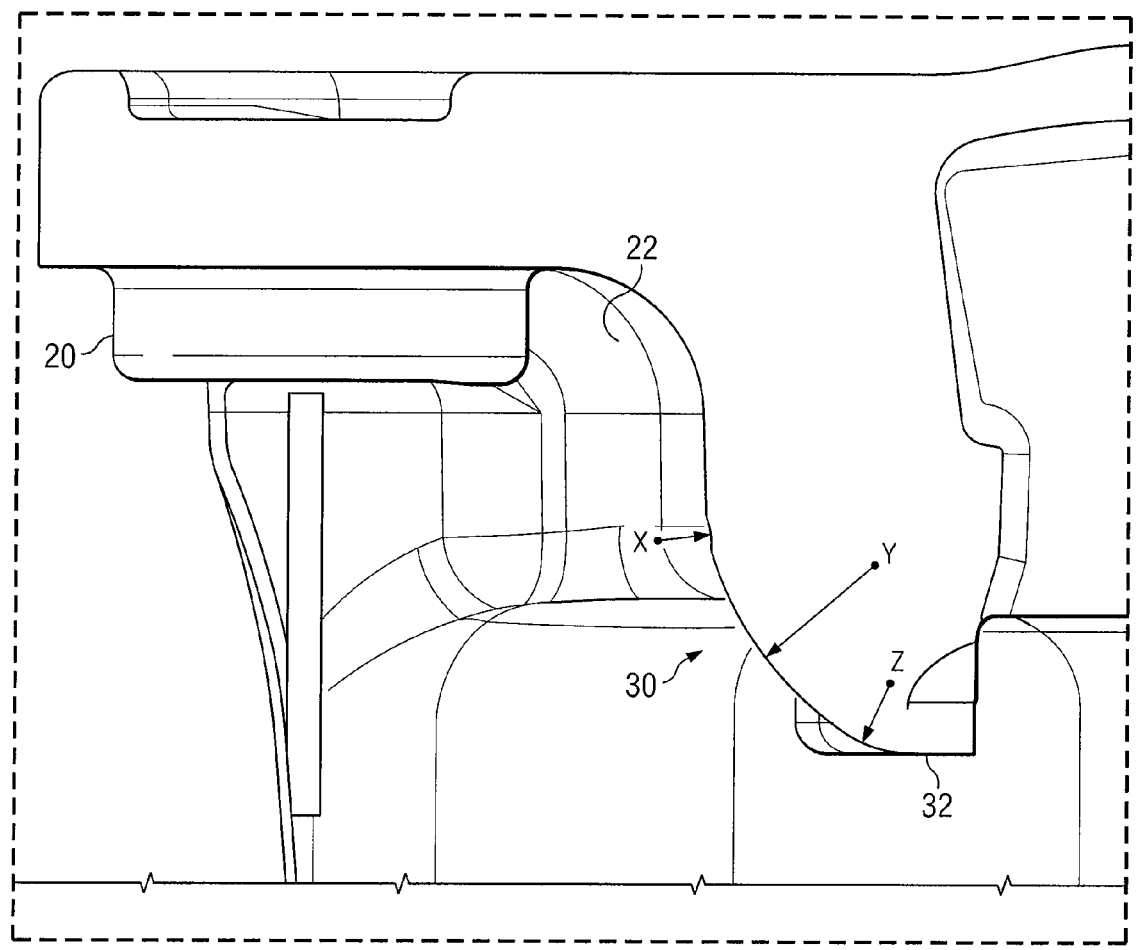
FIG. 1A is a side view, with portions cut away, of the railway car coupler head of FIG. 1 illustrating a top pulling lug.

The contour of top pulling lug face 30 is illustrated in FIG. 1A. It may be comprised of three portions, each having a different radius. A first radius X of an upper portion of top pulling lug 28 may be approximately 0.63 inches. This radius may transition into a second radius Y of a middle portion of top pulling lug 28 which may be approximately 2.75 inches. This 2.75 inch radius may transition into a third radius Z of a lower portion of top pulling lug 28 that may be approximately 1.00 inch. Other embodiments may include top pulling lug face contours having other suitable or desired dimensions, radii, or configurations.

The geometry and dimensions of the surfaces of coupler head 10 should allow proper assembly and operation of the knuckle. After the coupler head 10 has been used in operation, the geometry and dimensions of its surfaces may change as a result of operational wear and tear. As a result, the geometry of coupler head 10 should be inspected to ensure that it will still properly assemble with a knuckle. The inspection should also determine that the knuckle and coupler head 10 will operate properly. For example, the geometry and dimensions of top pulling lug 28 should not be allowed to impede the assembly with, and operation of, the knuckle.

The knuckle (and its identical counterpart on an adjacent coupler) may operate by contacting the guard arm of an adjacent coupler. In a joining operation, the knuckle of coupler head 10 and the opposing knuckle may each pivot inward to a degree sufficient to lock the two knuckles in place behind each other so that coupler head 10 is properly joined with the adjacent coupler. A lock member (not shown) slidably disposed within each coupler head 12, may be activated by the engagement to slide downward within the coupler head 10 and lock the knuckle in place to thereby join the two railway couplers together.

Coupler head 10 may be formed of a single, integral cast. It may be composed of quenched and tempered grade E steel. In operational service, certain dimensions of coupler head 10 may wear down. For example, the operation of the knuckle may cause dimensions of the pulling lugs 26 and 28 to wear. In some cases, to extend the service life of coupler head 10, a reconditioning operation may be performed. During this operation, a welding process may be used to build-up certain portions of coupler head 10 that have worn down during service. For example, top pulling lug face 30 may be built back up to near its original size and dimensions. Once the features are built back up using welds, a grinder may be used to clean up the welds. The welds may then be heat treated to ensure that they have the right hardness and tensile strength.

Once the weld build-up is complete, it may be necessary to ensure that the reconditioned coupler head 10 conforms to certain specifications and will function properly when joined with other parts and/or mated with other couplers. In some cases, the specifications for certain features and dimensions of a reconditioned coupler head 10 may be relaxed from the specifications for the originally manufactured part.

Tolerances of coupler head 10 may be controlled using gauges to measure and confirm proper positioning and dimensions of certain features of coupler head 10. For example, if operational wear and tear cause top pulling lug face 30 to form a sharp point, as opposed to a smooth contour, coupler head 10 may not properly receive, and be attached to, a knuckle. Moreover, even if the knuckle attaches to coupler head 10 it may not function properly because it may be impeded by the sharp point, deformity, or imperfection in top pulling lug face 30 which should be a smooth contour as described above.

Issues other than a sharp point of top pulling lug face 30 may be discovered through the use of a gauge according to an embodiment of the present invention. For example, if top pulling lug face 30 is allowed to expand during operational use and/or through build-up during reconditioning, it may occupy what should be free space of coupler head 10 within which the knuckle should be allowed to move. This may cause the knuckle to operate improperly. That is, the knuckle may not be allowed to pivot correctly to allow coupling or decoupling of a mating coupler attached to an adjacent railway car.

FIG. 2 illustrates an instrument to gauge a contoured surface of top pulling lug 28 in accordance with an embodiment of the present disclosure. Top pulling lug contour gauge 40 includes cylindrical portion 42, handle 46, and gauging blade 48.

Gauging blade 48 includes gauging contour 50. Gauging contour 50 is dimensioned to align with a corresponding contoured surface of top pulling lug face 30. Gauging contour 50 includes radii A, B, and C. Radii A, B, and C may be any suitable radius that will allow gauging contour 50 to follow top pulling lug face 30. In certain embodiments, radius A may be approximately five-eighths (0.625) of an inch, radius B may be approximately 2.75 inches, and radius C may be approximately 1.00 inch. Each of radius A, B, and C may have tolerances of plus or minus 0.002 inches or plus 0.004 inches in some embodiments. Radii A, B, and C may be configured to follow the radii of top pulling lug face 30 allowing a small clearance of space between gauging contour 50 and top pulling lug face 30. Radius A may correspond to the upper portion of top pulling lug 28, radius B may correspond to the middle portion of top pulling lug 28, and radius C may correspond to the lower portion of top pulling lug 28. Gauging contour 50 may be dimensioned such that when top pulling lug contour gauge is mated properly with coupler head 10, top pulling lug face 30 may be determined to be properly formed and present no hindrance to the assembly and operation of a knuckle coupled to coupler head 10.

Top pulling lug contour gauge 40 may also include gauge pinhole 44 through cylindrical portion 42. Gauge pinhole 44 may receive a pin when top pulling lug contour gauge 40 is coupled to coupler head 10 to assure conformity of coupler head 12 to certain specifications. Handle 46 may be used to allow an operator to easily transport and control top pulling lug contour gauge 40. For example, when top pulling lug contour gauge 40 is attached to coupler head 10 an operator may grasp top pulling lug contour gauge 40 by handle 46 and rotate blade 48 to ensure that there is clearance between gauging contour 50 and top pulling lug face 30.

In particular embodiments, a center-line of gauge pinhole 44 may be approximately 3.460 inches from the edge of contour 50 (with a tolerance of −0.004 inches), as shown by dimension D on FIG. 2. In some embodiments, the center-line of the pinhole may be approximately 3.500 inches from the contour transition between radius A and radius B (with a tolerance of −0.004 inches), as shown by dimension E on FIG. 2.

Top pulling lug contour gauge 40 may be formed of a single, integral casting or may be machined as a single, integral work piece. In certain embodiments, top pulling lug contour gauge 40 and/or any component thereof may be formed from plate steel cut to suitable dimensions. In alternative embodiments, top pulling lug contour gauge 40 may be formed from components welded together. For example, blade 48 and handle 46 may be welded to cylindrical portion 42.

FIG. 3 illustrates top pulling lug contour gauge 40 attached to railway car coupler head 10 in a gauging position. Pivot pin gauge 52 may be received through pivot pinhole 18 and gauge pinhole 44. In this configuration, top pulling lug contour gauge 40 may be allowed to pivot about pivot pin gauge 52. When top pulling lug contour gauge 40 is rotated, gauging contour 50 should clear top pulling lug face 30 of railway car coupler head 10. The clearance between gauging contour 50 and top pulling lug face may be less than or equal to approximately 0.5 inches. In certain embodiments, this clearance may be less than approximately 0.25 inches. An acceptable railway car coupler head 10 may even lightly contact gauging contour 50, and thus there may be no appreciable clearance in some cases. In some cases, the mere fact that there is any clearance such that the gauging contour can rotate freely without contacting the top pulling lug face is acceptable, no matter how large the clearance. Gauging blade 48 may be sized to allow it to move between top pulling lug 28 and bottom pulling lug 26.

However, if top pulling lug contour gauge 40 is unable to clear top pulling lug 28 because gauging contour 50 is hindered by the shape of top pulling lug face 30, coupler head 10 may be rejected as failing to meet use specifications for railway couplers. In that case, the coupler head may be further reconditioned to meet the appropriate specifications.

As described, in particular embodiments the contour gauge may be applied to a coupler that has been in operational service for some time to make sure there is still clearance between the gauge and top pulling lug face. If there is not enough clearance, then the pulling lug face may be reconfigured to provide for enough clearance. In some cases, it may be desirable to apply a reconditioning weld in order to build back up portions of the top pulling lug face. The reconditioning process may also generally refer to the process of checking the top pulling lug face with a gauge after operational use of the coupler.

Although the present invention and its advantages have been described in detail, it should be understood that various changes, substitutions, and alterations can be made therein without departing from the spirit and scope of the invention as defined by the appended claims.

What is claimed is:

1. A railway car coupler head contour gauge, comprising:
   a cylindrical portion configured to be rotatably coupled to a coupler head; and
   a gauging blade coupled to the cylindrical portion, the gauging blade having a gauging contour configured to align with a contour face of a top pulling lug of the coupler head after operational use of the coupler head.

2. The railway car coupler head contour gauge of claim 1, wherein the gauging contour comprises a first contour portion having a first radius greater than or equal to approximately 0.623 inches and less than or equal to approximately 0.627 inches.

3. The railway car coupler head contour gauge of claim 2, wherein the gauging contour comprises a second contour portion having a second radius approximately equal to 2.75 inches.

4. The railway car coupler head contour gauge of claim 3, wherein the gauging contour comprises a third contour portion having a third radius approximately equal to one inch.

5. The railway car coupler head contour gauge of claim 1, wherein the railway car coupler head contour gauge comprises steel.

6. The railway car coupler head contour gauge of claim 1, further comprising a handle coupled to a side of the cylindrical portion for operating the gauge.

7. The railway car coupler head contour gauge claim 1, wherein the cylindrical portion has a pin hole therethrough, the pin hole being configured to receive a pin operable to rotatably couple the railway car coupler head gauge and the coupler head.

8. The railway car coupler head contour gauge of claim 1, wherein the gauging contour is configured to allow for a clearance of approximately 0.25 inches between the gauging contour and the contour face of the top pulling lug when the contour gauge is coupled to the coupler head after operational use of the coupler head.

9. The railway car coupler head contour gauge of claim 1, wherein the gauging blade having a gauging contour configured to align with a contour face of a top pulling lug of the coupler head after operational use of the coupler head comprises the gauging blade having a gauging contour configured to ensure clearance between the gauging contour and the contour face of the top pulling lug of the coupler head after operational use of the coupler head.

10. A method of measuring a railway car coupler head after operational use of the coupler head, comprising:
    rotatably coupling a coupler head to a coupler head contour gauge comprising a cylindrical portion and a gauging blade, the gauging blade having a gauging contour; and
    aligning the gauging contour with a contour face of a top pulling lug of the coupler head after operational use of the coupler head.

11. The method of claim 10, further comprising forming a clearance between the contour face and the gauging contour.

12. The method of claim 11, wherein the clearance is less than or equal to approximately 0.5 inches.

13. The method of claim 12, wherein the clearance is less than or equal to approximately 0.25 inches.

14. The method of claim 10, wherein the gauging contour comprises a first contour portion having a first radius greater than or equal to approximately 0.623 inches and less than or equal to approximately 0.627 inches.

15. The method of claim 14, wherein the gauging contour comprises a second contour portion having a second radius approximately equal to 2.75 inches.

16. The method of claim 15, wherein the gauging contour comprises a third contour portion having a third radius approximately equal to one inch.

17. The method of claim 10, wherein rotatably coupling the coupler head to the coupler head contour gauge further comprises receiving a pin through a pin hole through the cylindrical portion.

18. The method of claim 10, wherein aligning the gauging contour with a contour face of a top pulling lug of the coupler head comprises rotating the gauging contour to ensure clearance between the gauging contour and the contour face of the top pulling lug of the coupler head.

19. The method of claim 10, further comprising using a welding process to build up the top pulling lug prior to coupling the coupler head contour gauge thereto.

20. The method of claim 10, wherein a portion of the gauging blade of the coupler head gauge is located between the top pulling lug and a bottom pulling lug when the gauging contour is aligned with the contour face of the top pulling lug.

21. The method of claim 10, wherein the railway car coupler head contour gauge comprises steel.

* * * * *